Oct. 14, 1969    R. R. EBY ET AL    3,472,544
TWINE CLAMP MEANS FOR BALER KNOTTER
Filed June 21, 1968    2 Sheets-Sheet 2

INVENTORS
RICHARD R. EBY
& EDWIN B. NOLT
BY
*[signature]*
ATTORNEY

United States Patent Office 3,472,544
Patented Oct. 14, 1969

3,472,544
TWINE CLAMP MEANS FOR BALER KNOTTER
Richard R. Eby, Ephrata, and Edwin B. Nolt, New Holland, Pa., assignors to Sperry Rand Corporation, New Holland, Pa., a corporation of Delaware
Filed June 21, 1968, Ser. No. 739,085
Int. Cl. B65h 13/26; A01p 15/14
U.S. Cl. 289—13                                11 Claims

ABSTRACT OF THE DISCLOSURE

Twine clamp means in a knotter unit of a baler comprising a pair of relatively stationary and movable clamp members having complementary clamping surfaces to engage one end of a strand of twine, pressure means engaging the movable clamp member to hold the same unyieldingly in clamping engagement against the twine during the bale formation portion of the tying cycle of the knotter unit, and actuating means operable to release said clamp members from said unyielding engagement with said twine and maintain said clamp members in yieldable clamping engagement with said twine during another portion of the tying cycle to permit the clamped twine to be pulled from between the clamp members when a knot has been formed to secure the ends of a strand of twine together, the yieldable clamping engagement exerted by said actuating means being adjustable.

Cross-reference to related applications

The present invention comprises an improvement over co-pending application Ser. No. 660,967, filed Aug. 16, 1967, now U.S. Patent 3,418,014, granted Dec. 24, 1968, and entitled "Knotter Clamp Means for Baler." The latter application is one of a series pertaining to a substantial range of inventions comprising improvements in knotter mechanism for a baler.

Background of the invention

Balers for compressed agricultural products of the type employing a plurality of strands of twine to tie a mass of such compressed product material into a completed bale require a knotter unit for each strand of twine. Such knotter units function automatically and simultaneously to tie the opposite ends of said strands into a tight knot so as to hold the bale intact for further handling. To perform the knotting function, the leading end of each strand of twine is secured in clamped position by a pair of complementary clamp members included in each knotter unit, usually adjacent the upper surface of the bale being formed.

During the progressive formation of each bale, said strands of twine are extended around the bale until it reaches a predetermined size, following which a pivoted twine needle carries the remainder of the strand of twine from a continuous supply thereof around the compressed bale by extending an elongated loop of said twine around the trailing end of the bale and into engagement with the clamped end of the twine for formation of a knot therewith. Incident to the knotting operation, the tied strands are severed from the supply strands, whereupon the new leading end of the supply strand remains threaded through an eye in the end of said needle and is immediately clamped between the clamp members so that the formation of the next loop or strand of twine may proceed to be formed around the next bale of material to be produced.

The knotter mechanism of a baler includes adjacent knotter units and clamping units. The functioning of the knotter units immediately precedes certain operations of the clamp members, one of the clamp members being movable with respect to the other for purposes of cooperating with the knotter unit in the formation of a knot. The knotter and clamp units are operated respectively by somewhat similar rotatable shafts upon which small gears are affixed. These gears are engaged by appropriate means such as a segmental gear to effect rotation of the shafts of the knotter unit and the movable clamp member of each.

Until the development of the invention comprising the subject matter of said aforementioned co-pending application Ser. No. 660,967 it was customary in preceding balers, of the type employing twine to tie the bales, to provide clamping pressure between movable and stationary clamp members by directing force axially against the small gear on the shaft of the movable clamp member in a direction to provide the desired clamping pressure between the cooperating surfaces of the stationary and movable clamp members. Typical structures of this type are illustrated in prior Patents Nos. 512,762, to Stewart, dated 1894, and 615,815, to Dennis, dated 1898.

It was found that by exerting such pressure directly against the small driving gears for said shafts of the movable clamp members, they were forced into unnecessarily close frictional engagement with the segmental driving gears, which actuated said small gears, thereby causing premature and excessive wear upon the teeth of all of the gear members. This resulted in more frequent replacement of the same than would be necessary if other types of pressure means were provided.

The invention comprising the subject matter of said aforementioned co-pending application Ser. No. 660,967 has very largely eliminated the unsatisfactory operating conditions of the types of knotter mechanisms used heretofore and especially the premature wear upon the gears of the clamping units and operating units therefor. However, it has been found that still further improvement in the clamping functions of the clamping unit have been possible to effect further efficiencies in the operation of such improved knotter mechanism, and said further improvements comprise the subject matter of the present invention, details of which are set forth hereinafter.

Summary of the invention

Whereas the twine clamping mechanism comprising the subject matter of said aforementioned pending application Ser. No. 660,967 has eliminated undue wear upon the driving gears for the shafts of the knotter units which support the movable clamp member of the clamp unit the mechanism described and claimed in said co-pending application to accomplish this now has been found to be capable of being simplified, not only to employ fewer parts but also to improve the twine clamping and releasing functions of the mechanism. Accordingly, it is the principal object of the present invention to provide in a bale knotter mechanism a clamping unit in which relatively simple lever means are employed to exert firm and unyielding clamping pressure against the movable clamp member during a portion of a tying cycle of the mechanism to force it into such clamping relationship with a stationary clamp member of said unit so as to resist any slipping movement of twine when engaged therebetween while said clamp members are held in said unyielding clamped relationship, and during another portion of the cycle of operation of said mechanism, said unyielding clamping relationship of the clamp members is relieved and yieldable clamping pressure is established between the clamp members to permit yieldable feeding of the twine to the billhook during the knot tying cycle.

Another object of the invention is to provide a substantially unitary lever which, preferably, is a bell crank, having a cam follower on one arm engageable by a movable cam in such manner that during the operating cycle of the knotter mechanism, the other arm of the bell crank is moved by unyielding pressure into engagement with the movable clamp member to dispose it in firm and unyielding engagement with the stationary clamp member to securely clamp the end of a strand of twine therebetween against removal therefrom during a portion of the cycle of operation of the knotter mechanism, while during another portion of said cycle, such non-yielding clamping relationship between the clamp members is relieved and, instead, relatively simple means exert yieldable pressure upon the lever in such manner as to provide yieldable clamping engagement between said clamp members and thus permit the withdrawal of the clamped end of the strand of twine therefrom, such as when opposite ends of said strand has been tied into a knot and the bale is to be discharged from the baler.

It is a further object of the invention to provide means to adjust the tension of the aforementioned yieldable pressure means and also to adjust the engagement between one arm of the bell crank and the outer end of the movable clamp member so that an unyielding clamping pressure of predetermined amount can be established so as to prevent damage to or undue wear upon the mechanism and also permit compensation for normal wear without impairing operation of the clamping function.

Details of the invention and the foregoing objects, as well as other objects thereof, are set forth in the following specification and illustrated in the accompanying drawings comprising a part thereof.

Description of the preferred embodiments

Figure 1:
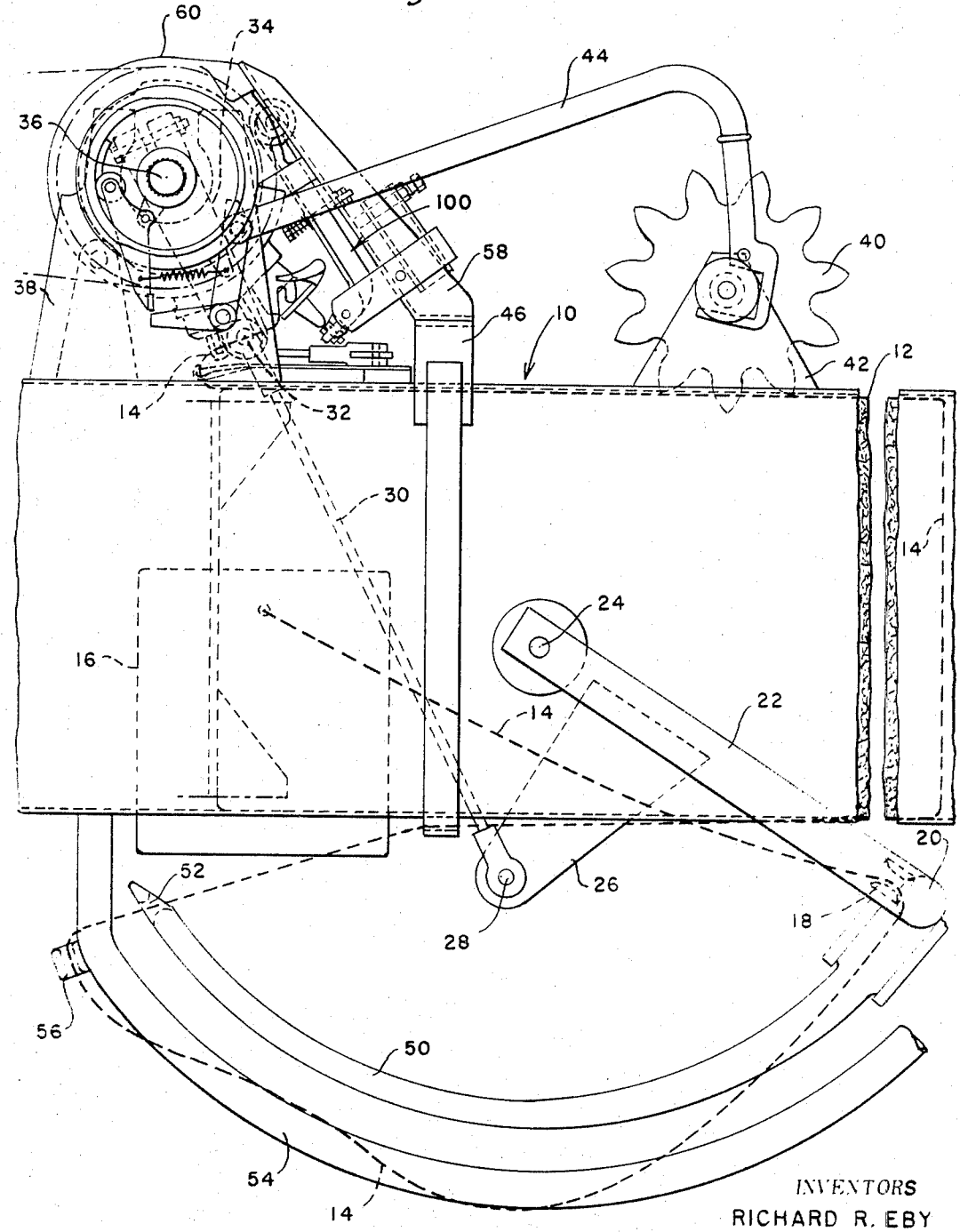
FIG. 1 is a fragmentary side elevation of a baler having a knotter mechanism incorporating the improved twine clamp lever and associated mechanism comprising the subject matter of the present invention.

In order to readily understand the benefits and characteristics of the present invention in comparison with the prior art and the function and operation of the knotter mechanism comprising the subject matter of said aforementioned co-pending application over which the present invention is an improvement, a limited amount of the overall mechanism of a typical baler to which the present invention is applicable is illustrated in FIG. 1. Referring to said figure, a portion of a typical bale case 10 is shown fragmentarily, part of the same being broken away to foreshorten the view and also to expose, in the broken portion, fragmentary parts of a bale 12 in process of being formed within the case 10. Also, a strand of twine 14 is illustrated somewhat fragmentarily and diagrammatically by a dotted line in FIG. 1.

It will be seen that said strang extends from a suitable container 16 in which, for example, a conventional ball of such twine is disposed. From the container, the twine extends through a guide 18 supported, for example, by a transverse bar 20. Connected to the opposite ends of said bar are a pair of radial arms 22, the opposite ends of the same being connected to axially aligned pivots 24 which are fixed to the opposite sides of case 10. An actuating ear 26 is connected at one end and extends laterally from one of the arms 22. The outer end of said ear is pivotally connected by a bolt 28 to one end of a connecting rod 30. The opposite end of connecting rod 30 is pivotally connected to a crank pin 32 provided on the outer end of crank arm 34 which is non-rotatably keyed to drive shaft 36.

Figure 3:
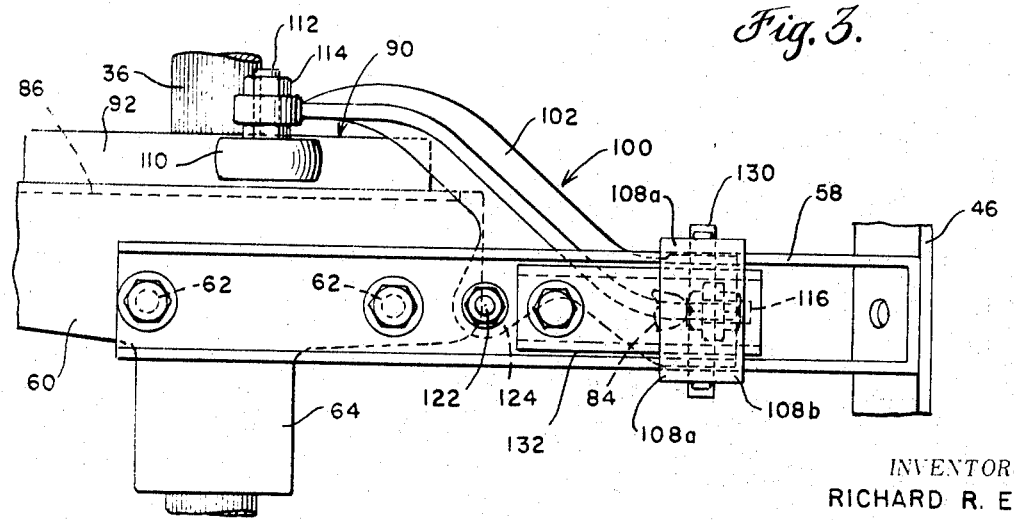
FIG. 3 is a fragmentary view of a portion of the mechanism shown in FIG. 2 as seen on the line 3—3 of said figure.

As somewhat fragmentarily illustrated in FIG. 3, drive shaft 36 extends transversely along the top of case 10, the opposite ends thereof being supported in suitable bearings which are formed in the upper portions of brackets 38 which respectively are mounted adjacent opposite sides of the upper portion of case 10. The drive shaft 36 is interconnected by means, not shown, to appropriate drive means in the baler and the operation of drive shaft 36 is controlled by a star wheel 40 which is supported on a suitable shaft rotatably mounted in the upper portions of vertical brackets 42, for example, as shown in FIG. 1.

Well-known means provided on the star wheel 40 cooperate with the outer end portion of a pivotally mounted control arm 44. The opposite end of control arm 44 is inner connected to and controls the operation of a well-known type of clutch, not shown, which is known in the baler art as a one-revolution clutch. Said clutch functions to rotate the drive shaft 36 for one complete revolution and then abruptly stops any further revolving movement of the drive shaft until the next cycle of operation is required. As the bale 12 progressively forms, the star wheel 40 enmeshes in the upper surface portion thereof and revolves, ultimately causing actuation of the control arm 44 to initiate movement of the aforementioned one-revolution clutch, thereby causing various functions of the knotter mechanism, in a manner described hereinafter.

Figure 2:
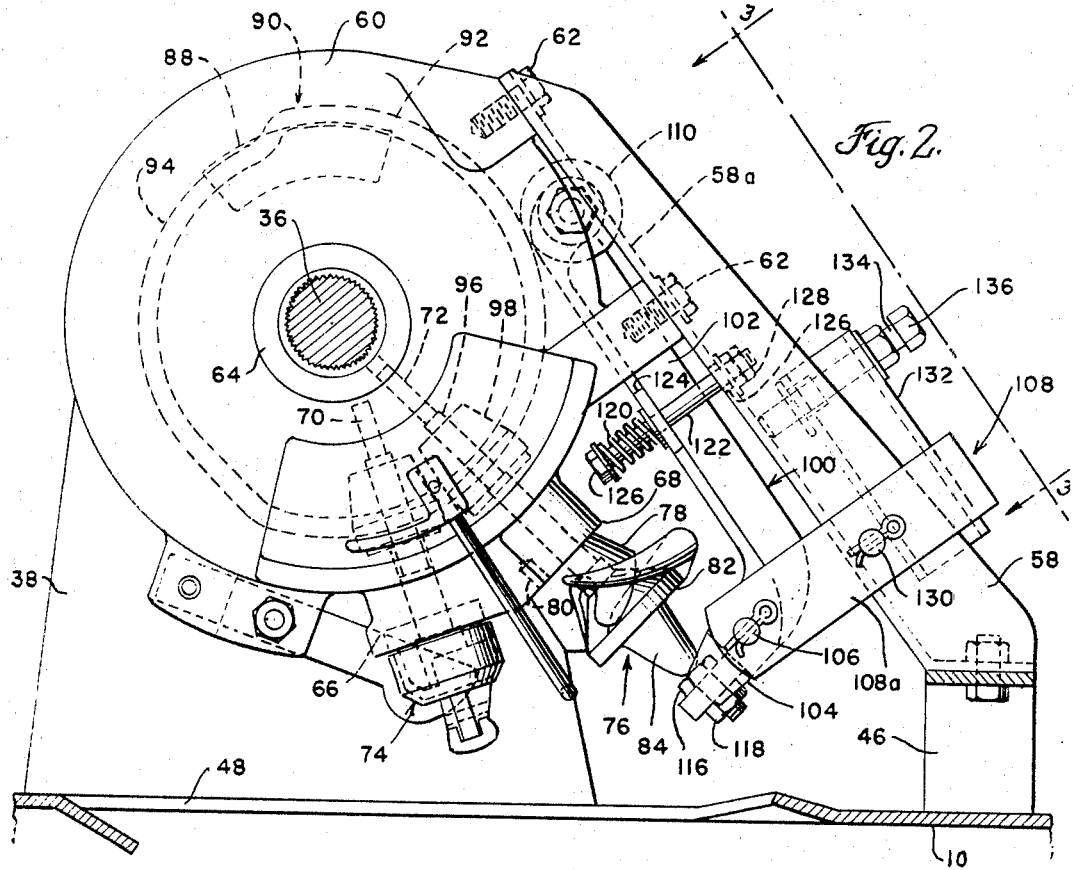
FIG. 2 is a fragmentary side elevation of the essential portions of the knotter mechanism illustrated in FIG. 1 but shown on a larger scale than in said figure and illustrating the improvements particularly comprising the present invention.

Also connected to the upper wall of case 10 is a fixed mounting bar 46 which, as shown particularly in FIG. 2, is mounted adjacent one end of a plurality of transversely spaced, parallel slots 48 which are formed in the top wall of case 10. Said slots respectively are in vertical alignment with a pair of similar, transversely spaced curved twine needles 50. One end of each needle is fixedly secured to the transverse bar 20 and the outer end of each needle has an eye 52 therein through which the strand of twine 14 extends as shown in FIG. 1.

Extending downward from and connected to the lower wall of case 10, in vertical alignment with each needle 50, is an arcuate guard 54. The ends of said guard are fixedly connected to the case 10 by suitable means and said guards protect the needles 50 from damage as when said baler is moving over rough terrain. An additional twine guide 56 is supported by each guard 54 adjacent one end as shown in FIG. 1. During the aforementioned cycle of operation of the knotter mechanism, which is effected by the aforementioned single revolution of drive shaft 36, the outer ends of all of the arcuate needles 50 are projected upwardly simultaneously through the slots 48 therefor shown in FIG. 2, so as to project an elongated loop of the twine 14 around the trailing end of the bale 12 and especially to extend the uppermost end of said loop into a position wherein it can be operated upon by the knotter and clamping units described hereinafter.

Projecting upwardly, preferably at an angle, from the mounting bar 46, and preferably in vertical alignment with the slots 48, are a plurality of rigidly mounted supporting arms 58 connected by a web portion 58a. A knotter frame casting 60 is secured by suitable bolts 62, see FIG. 2, to the outer end portions of the supporting arms 58. Each of the castings 60 actually comprise a housing having a central bearing 64 formed thereon within which the drive shaft 36 is rotatably supported. Said housing is also formed with a pair of connected bosses 66 and 68 which project therefrom as best seen in FIG. 2, said bosses having radially extending bores therethrough comprising bearings which receive radial shafts 70 and 72 therein.

Shaft 70 operates a knotter unit 74 which comprises the subject matter of another pending application Ser. No. 633,496, filed Apr. 25, 1967, now U.S. Patent 3,410,-589, granted Nov. 12, 1968 and to which attention is directed for further details. Shaft 72 supports and operates a clamping unit 76 and it is primarily this unit with which the present invention is concerned. The shaft 72 extends through a stationary clamp member 78 which abuts the outer face of boss 68 and is held against rotation with respect to the same by appropriate means such as keying pin 80 but projects into a complementary recess formed in boss 68. Clamping unit 76 also includes movable clamp member 82 which is fixed by pin means or otherwise, to the outer end of shaft 72 and terminates with a projection 84 which preferably has a rounder outer end for purposes to be described.

It will be seen especially from FIG. 3 that the knotter frame casting 60 is somewhat cup-shaped, the open face thereof being closed by a circular closure plate 86 which is keyed to and rotatable with drive shaft 36. Plate 86 serves a dual function. One function is to support an internal toothed segmental rack 88 which is outlined by dotted lines in FIG. 2, and the second function is to support on the other face thereof an integral cam 90. From FIG. 2, it will be seen that the cam 90 has a major operative surface portion 92 of uniform radius and extends around the axis of shaft 36 substantially greater than 180°. The opposite ends of said operative surface portion 92 of cam 90 are suitably connected to the opposite ends of a segmental relief cam surface portion 94, the radius of which is substantially uniform and less than the radius of the operative surface portion 92 of said cam.

Referring to FIG. 2, the radial shaft 72 of the clamping unit 76 is provided intermediately of its ends with a splined portion 96, the splines extending axially through a complementary axial opening formed centrally in the small gear 98 which also is mounted on shaft 72. The gear 98 meshes with the toothed segmental rack 88 which is carried by closure plate 86 and, upon the rotation of said closure plate by drive shaft 36, shaft 72 is rotated due to the meshing of the gear 98 with said segmental rack 88 for purposes of rotating the movable clamp member 82 through a single revolution with respect to stationary clamp member 78. The splined interconnection between portion 96 of shaft 72 and the small gear 98, while keying said shaft and gear for simultaneous rotation, also permits limited axial movement of shaft 72 relative to gear 98 incident to certain functions of the clamping unit 76, details of which are described fully in said co-pending application Ser. No. 660,967, filed Aug. 16, 1967, and to which attention is directed for such additional description.

During the formation of a bale 12 and the arrangement of a plurality of loops of the twine 14 therearound, the terminal end of each strand of twine is firmly clamped by an individual clamping unit 76 for each strand which is to be extended around such bale. Such end of the strand of twine is disposed between complementary clamping surfaces respectively formed on stationary clamp member 78 and movable clamp member 82. During the knotting operation cycle of the entire knotter mechanism illustrated in FIG. 2, which occurs upon the completion of the formation of a bale within the case 10, and particularly during that portion of the cycle when the needles 50 are projecting upwardly through the compacted material to define the trailing end of a bale 12, a very substantial amount of tension is imparted to the strands of twine extending around the bale.

Accordingly, it is most essential that the clamped leading end of each strand be firmly and non-removably clamped between the clamp members 78 and 82 of clamping unit 76 in order that such clamped end of the twine will be accurately positioned for engagement of the knotter unit with a portion of the twine strand adjacent the clamped end thereof. However, near the completion of the knotting cycle, it is equally essential that the end of the strand of twine which has been clamped by clamping unit 76 be released from said clamping unit in order that each tied and knotted strand which encircles the completed bale may move with the bale to the discharge end of case 10. It is in regard to this feature of the operation of the knotter mechanism that the present invention primarily is concerned and details of the structure thereof which is different from the structure comprising the subject matter of said co-pending application Ser. No. 660,967 are as follows.

A simple unitary lever 100, which preferably comprises a bell crank having a relatively short arm or leg 104, extending substantially at a right angle to each other, is pivotally supported adjacent the connection of said arms by a pivot pin 106. Effective supporting means for the pivot pin 106 comprises a U-shaped bracket 108, having a pair of legs 108a and a bight portion 108b connecting one end of the legs, extending around arms 58. The pair of parallel legs 108a are pivotally connected to opposite sides of each of the supporting arms 58 by pivot pin 130 and are provided at the free ends thereof with suitable, axially aligned holes which receive the pivot pin 106 transversely therebetween. Appropriate means such as cotter pins prevent accidental removal of the pin from its supporting means.

A box shaped tubular portion 132 is fixed to the underside of bight portion 108b between arms 58, as shown in FIGURES 1, 2 and 3. The tube 132 extends between the legs 58 and parallel thereto in either direction from bight portion 108b. A bolt 134, threadably engageable with the tube 132, extends through the tube and abuts against web portion 58a of the supporting arms. By turning headed portion 136 of bolt 134 the U-shaped bracket 108 is caused to pivot about pin 130, causing a corresponding movement in lever 100 pivotally connected thereto by pin 106.

With reference to FIG. 3, it will be seen that the long arm 102 of the bell crank pressure lever 100, in plan view, is laterally offset between its pivot portion and the outer end thereof. This is for purposes of permitting the outer end to support a cam follower 110 which preferably comprises an anti-friction roller supported by pivot shaft 112 which extends through an appropriate hole in the outer end of arm 102 the shaft being secured operatively within said hole by a suitable nut 114 or the like. The roller 110 comprising a cam follower which rotatably engages the outer circular surface of cam 90 as illustrated in FIG. 2.

The opposite end of the bell crank pressure lever 100, comprising the shorter arm 104, supports a pressure shoe 116 which for example, may be in the form of a rivet, or a bolt which extends through a complementary threaded bore formed in the short arm 104 of the bell crank pressure lever 100. A lock nut 118 engages the projecting threaded end of the bolt 116, whereas the head thereof comprises the actual pressure member that engages the terminal, rounded end of movable clamp member 82.

When the various elements comprising the knotter mechanism illustrated and described herein are assembled into operative relationship, the cam follower roller 110 is placed in engagement with the operative surface portion 92 of cam 90.

The force applied by lever 100 to projection 84 may be varied by turning headed portion 136 of bolt 134 causing bracket 108 to pivot about pin 130 to exert more or less pressure on the clamping mechanism, or the outer pressure surface of shoe 116 may be rotated to suitably dispose the outer end thereof into firm engagement with projection 84 so that the complementary gripping surfaces of the stationary and movable clamp members 78 and 82 are in firm, unyieldable clamping engagement with each other. Adjustment of the applied force may also be accomplished by either of these operations or by a combination thereof, or if a rivet is used in place of the shoe 116 and locking nut 118, only the bolt 134 need be turned for the adjustment.

When the mechanism has been adjusted as described, during the time a bale 12 is being formed in case 10, the terminal end of the strand 14 of twine is firmly clamped between the gripping surfaces of clamp members 78 and 82 by suitable force which is unyieldable due to the rigid nature of both arms and the pivot means of the bell crank pressure lever 100. Such clamped relationship of the clamp members is as illustrated in FIG. 2 including the engagement of cam follower 110 of lever 100 with the operative surface portion 92 of the cam 90. However, it will be understood that during the clamping and holding function of the clamping unit 76 while a bale is being formed, it is possible that the cam follower 110 will be in engagement with another location of the operative surface portion 92 of cam 90, from that shown in FIG. 2 as dictated by the direction of rotation of the drive shaft 36 and the cam 90 which is rotatably driven thereby during the knotting cycle of the mechanism.

As indicated above, however, particularly near the completion of the knotting cycle of the mechanism, it is necessary that the clamped terminal end of the strand of twine be yieldably released from between the complementary clamping surfaces of the stationary and movable clamp members 78 and 82. Accordingly, this is made possible by the provision of the segmental relief surface portion 94 which comprises a minor portion or segment of the circumference of cam 90 and which, during the operative revolution of the drive shaft 36 and cam 90, is rotatably moved into position to pass by the cam follower 110 without necessarily contacting the same. When this occurs, the lever 100 will tend to move, counterclockwise, as viewed in FIG. 2, about its pivot pin 106. Were no means provided which would otherwise prevent such counterclockwise movement, the pressure shoe 116 would cease to exert appreciable axial clamping pressure at all upon movable clamp member 82 to move it into clamping engagement with stationary clamp member 78. This would completely destroy any effective clamping relationship of any kind between the two clamp members.

The present invention, however, prevents any such limited and relatively free counterclockwise movement of the pressure lever 100 by providing preferably yieldable means in the form of a compression spring 120, of predetermined length and strength. Said spring surrounds a portion of a supporting member comprising a bolt 122, or other equivalent member, which extends through a suitable opening in an ear 124, see FIG. 3, on long arm 102 of pressure lever 100. The bolt 122 also extends through an axially aligned hole 126 which is formed in the bottom flange 58a of the channel-shaped supporting arm 58. The diameter of hole 126 preferably is larger than that of the bolt 122 to permit limited free movement of the bolt with respect to supporting arm 58.

If desired, appropriate washers may be mounted upon the bolt 122 in engagement with opposite ends of spring 120, one of said washers engaging the head 126 of bolt 122. The opposite end of bolt 122, if desired, also may extend through a suitable washer and also threadably receive a pair of locking nuts 128 on the outer threaded end of the bolt so as to provide a desired amount of compressive force in the spring 120 which is applied in a direction to prevent any appreciable amount of counterclockwise movement of the pressure lever 100 when the cam follower 120 is disposed opposite the segmental relief surface 94 of cam 90.

It thus will be seen the spring 120 provides yieldable means suitable to exert a desired amount of clamping force, but of a yieldable nature, to the pressure shoe 116 against the terminal end of projection 84 on movable clamp member 82 and, thus, continue to provide an operable amount of clamping pressure by clamp member 82 upon the clamped end of the strand of twine disposed between the clamp members 78 and 82, although said pressure is materially less than the unyieldable pressure which is exerted upon the movable clamp member 82 when the cam follower 110 is in positive engagement with the operative surface portion 92 of cam 90.

The amount of yieldable force exerted by spring 120 upon the movable clamp member 82 through the mechanism described immediately above is adequate to maintain the clamped end of the strand of twine in operative position by the clamping unit 76 until the function of the knotter unit 74 substantially has been completed and the cycle of operation is such that the movable clamp member 82 will be revolved by gear 98, incident to which the clamped end of the strand of twine must be pulled from between the complementary clamped surfaces of clamp members 78 and 82, notwithstanding the yieldable force exerted by spring 120 upon said clamp member.

In accordance with the completion of the cycle of operation of the knotter mechanism, by the time the leading end of the operative surface portion 92 of cam 90 next engages the cam follower 110 to re-establish the aforementioned unyielding clamping pressure between the clamp members, the new leading end of the next strand of twine to encircle a new bale has been introduced between the complementary clamped surfaces of clamp member 78 and 82 and thus is in position to be firmly clamped therebetween.

During the functioning of the release of the movable clamp member 82 from being unyieldably forced into clamping engagement with stationary clamp member 78 to being yieldably urged into clamping engagement therewith by the force of spring 120, it is essential that the movement of the shaft 72 axially within the bearing therefor in boss 68 and the complementary opening within gear 98 shall be sufficiently free that the movable clamp member 82 quickly may respond to such relief in extreme clamping pressure to a less intense, yieldable clamping pressure. To insure such limited relative freedom of movement of the shaft within said supporting means as described, it is preferred that the bearing opening for the shaft in boss 68 be offset a very limited distance, such as of the order of a maximum of approximately .015" from the theoretical center line for said bearing opening as dictated by the calculated arrangement of the axial center of gear 98 and its intended meshing with the teeth of arcuate rack 88. Such arrangement will eliminate any tendency on the part of the driving engagement between gear 98 and arcuate rack 88 to cramp or otherwise frictionally impede axial movement of shaft 72 within the bearing in boss 68.

From the foregoing, it will be seen that the present invention provides very simple means to clamp the end of a strand of twine in the form of a preferably unitary bell crank pressure lever, operative and relief cam surfaces engageable with a cam follower on said lever, and adjustable pressure transmitting means on said lever engageable with the movable clamp member to force it into unyieldable clamping engagement with the stationary clamp member in combination with equally simple pressure adjustable means for the pressure transmitting means on the arm of the bell crank which is coengageable with the movable clamp member and adjustable means to vary the pressure exerted by yieldable means, preferably in the form of a spring, which operates when the relief surface portion of the cam is opposite the cam follower so as to prevent any complete release of clamping pressure between the stationary and movable clamp members upon such strand of twine. Instead, adequate yieldable pressure is provided to permit release of such clamped end of a strand of twine from between said clamp members at the completion of the knotting operation when it is necessary to effect such disengagement from said clamping unit. Accordingly, completely controlled release of the twine is provided by the mechanisms of the present invention in a far more refined and desirable manner than has heretofore been possible.

While the invention has been illustrated and described in its several preferred embodiments, it is to be understood that the invention is not to be limited to the precise details herein illustrated and described since the same may be carried out in other ways falling within the scope of the invention.

Having thus described our invention, what we claim is:

1. Twine clamp means for a knotter unit of a baler arranged to apply a plurality of strands of twine around a bale of compacted agricultural product material, said twine clamp means comprising a pair of clamp members having opposed complementary clamping surfaces adapted to clampingly receive therebetween an end portion of a strand of twine and hold the same in operative position during a tying cycle of the knotter unit, means to support one of said clamp members stationarily relative to said knotter unit, a rotatable shaft extending through said stationary clamp member and connected at one end to the other clamp member to move the same relative to said stationary clamp member during a portion of said tying cycle, and gear mechanism engaging said shaft and operable to rotate the same about its axis, in combination with pressure means engageable with said movable clamp member and operable during a portion of said tying cycle to exert pressure against said movable clamp member adequate to force it into non-yieldable clamping engagement with said stationary clamp member, and actuating means operable during another portion of said tying cycle to release said movable pressure member from applying said non-yielding clamping pressure against said movable clamp member and apply yieldable pressure thereon to permit the clamped end of a strand of twine to be pulled from between said clamp members.

2. The twine clamp means according to claim 1 wherein, said pressure means engageable with said movable clamp member is adjustably positionable for direct engagement with said movable clamp member, thereby to effect adjustment of said non-yieldable clamping engagement of said movable clamp member with said stationary clamp member.

3. The twine clamp means according to claim 1 further including a cam having operative and relieved cam surface portions thereon, and means movably supporting said cam for engagement of said operative and relieved cam surface portions thereof with said pressure means, whereby when said pressure means is engaged by said operative cam surface portion of said cam means it effects said non-yielding clamping engagement of said movable clamp member with said stationary clamp member and when said relieved cam surface portion of said cam means engages said pressure means said movable clamp member is maintained in yieldable clamping engagement with said stationary clamp member.

4. The twine clamp means according to claim 3 in which said movable and stationary clamp members are aligned axially upon said rotatable shaft and said pressure means comprises a lever pivotally supported for limited movement about an axis adjustably positionable relative to said knotter unit, said lever having a portion engaged by said cam surface portions of said cam means and also having another portion engaging said movable clamp member to exert clamping pressure thereon.

5. The twine clamp means according to claim 4 in which said movable cam is rotatable about an axis transverse to said rotatable shaft upon which said clamp members are axially aligned and said pressure lever comprising a bell crank having a cam follower on one end thereof engageable with said cam surface portions of said cam means and the other end of said bell crank engaging said movable clamp member exerting pressure substantially axially thereto.

6. The twine clamp means according to claim 5 in which said end of said pressure bell crank lever which engages said movable clamp member is provided with a shoe for engagement with means on the outer end of said movable clamp member, whereby said non-yieldable pressure exerted by said bell crank lever upon said movable clamp member may be adjusted to provide a predetermined amount on non-yieldable pressure.

7. The twine clamp means according to claim 5 in which said movable cam is substantially circular and said relieved cam surface portion thereof extends through an arc comprising a portion of the entire circumference of said cam, and said actuating means comprising a spring engageable with one arm of said bell crank lever to exert yieldable pressure upon the end of said bell crank lever which engages said movable clamp member.

8. The twine clamp means according to claim 1 in which said pressure means is a lever having a cam follower thereon, and said twine clamp means further including adjustment means for supporting said lever for limited pivotal movement about an axis adjustably positionable relative to said knotter unit, a cam rotatably mounted relative to said lever and having a substantially circumferential operative cam surface provided with a relief section, said cam surface being engageable by said cam follower on said lever, additional means on said lever engageable with said movable clamp member and operable to move the same into non-yieldable clamping engagement relative to said stationary clamp member when said cam follower engages said operative cam surface of said cam, and yieldable means engaging said lever and operable to maintain yieldable clamping pressure upon said additional means on said lever which engages said movable clamp member when said relief section of said cam moves adjacent said cam follower of said lever.

9. The twine clamp means according to claim 8 in which said lever is a substantially L-shaped bell crank pivotally supported by said adjustment means adjacent the connected portion of said arms of said bell crank, one arm of said bell crank being positioned to engage an outer end portion of said movable clamp member and the other arm of said bell crank having said cam follower mounted thereon adjacent the outer end thereof, said yieldable means engaging said other arm of said bell crank, to urge yieldable clamping pressure upon said movable clamp.

10. The twine clamp means according to claim 9 wherein, said adjustment means includes a U-shaped bracket pivotally supported on said knotter unit, said bracket having a pair of spaced parallel legs pivotally connected to said knotter unit intermediate the ends thereof, a bight portion connecting one end of said legs, a pin extending between said legs at the other end thereof pivotally supporting said lever between said bracket legs and means for pivoting said bracket relative to said knotter unit, said means being fixed to said bight portion of said bracket and engageable with said knotter unit.

11. The twine clamp means according to claim 9 in which said yieldable means is a compression spring engaging said other arm of said bell crank, and said twine clamp means further including adjustable means engaging the other end of said spring and operable to vary the compressive force exerted thereby upon said other arm of said bell crank and thereby impart said yieldable clamping pressure upon said arm of said bell crank which engages said movable clamp member.

References Cited

UNITED STATES PATENTS

| | | | |
|---|---|---|---|
| 1,155,860 | 10/1915 | Loitte | 289—13 |
| 1,529,914 | 3/1925 | Prochazka | 289—13 |
| 2,716,035 | 8/1955 | Thorndike | 289—13 |

LOUIS K. RIMRODT, Primary Examiner